United States Patent [19]
Secord

[11] Patent Number: 5,373,687
[45] Date of Patent: Dec. 20, 1994

[54] MULCHING BLADE

[76] Inventor: Walter J. J. Secord, 7544 Ford, Warren, Mich. 48091

[21] Appl. No.: 159,746

[22] Filed: Dec. 1, 1993

[51] Int. Cl.⁵ ............................................. A01D 55/00
[52] U.S. Cl. ...................................... 56/17.5; 56/255; 56/295
[58] Field of Search ............. 56/12.8, 12.9, 13.3–13.9, 56/16.4, 16.9, 17.4, 17.5, 255, 295, 320.1, 320.2, 503, DIG. 17, DIG. 20

[56] References Cited

U.S. PATENT DOCUMENTS

| | | | |
|---|---|---|---|
| 3,703,071 | 11/1972 | Anderson | 56/295 |
| 3,797,212 | 3/1974 | Pursel | 56/255 |
| 4,083,166 | 4/1978 | Haas | 56/13.7 |
| 4,189,903 | 2/1980 | Jackson et al. | 56/255 |
| 4,189,904 | 2/1980 | Paker | 56/255 |
| 4,205,510 | 6/1980 | Raniero | 56/12.9 |
| 4,205,512 | 6/1980 | Thorud | 56/13.4 |
| 4,292,791 | 10/1981 | Lalonde | 56/255 |
| 4,318,268 | 3/1982 | Szymanis | 56/255 |
| 4,617,788 | 10/1986 | Sebastian | 56/295 |
| 4,967,546 | 11/1990 | Forbush | 56/255 |
| 5,056,605 | 10/1991 | Bond et al. | 172/111 |
| 5,094,065 | 3/1992 | Azbell | 56/255 |
| 5,179,823 | 1/1993 | Pace | 56/16.9 |
| 5,197,268 | 3/1993 | Barrera | 56/255 |
| 5,205,113 | 4/1993 | Fassauer | 56/12.8 |
| 5,209,052 | 5/1993 | Carroll | 56/255 |

Primary Examiner—Ramon S. Britts
Assistant Examiner—Pamela Anne O'Connor
Attorney, Agent, or Firm—Brooks & Kushman

[57] ABSTRACT

A mulching blade for use with a rotary powered lawn mower. The mulching blade comprises a generally planar disk shaped mulching member having an outside perimeter defining mulching teeth and a center attachment opening. The mulching blade also has a generally planar attachment bridge spanning the center attachment opening and spaced away from the disk shaped mulching member in a generally parallel relationship. The attachment bridge is supported by bridge ends attached to the disk shaped mulching member. The attachment bridge has a drive shaft opening such that the cutting blade of the lawn mower may be slid between the attachment bridge and the disk shaped mulching member such that both may be mounted together onto the drive shaft of the rotary lawn mower.

8 Claims, 2 Drawing Sheets

MULCHING BLADE

TECHNICAL FIELD

This invention relates to rotary power lawn mowers, and more specifically to a mulching blade to be used with such mowers.

BACKGROUND ART

The clippings of grass, leaves and other organic waste material generated by a rotary lawn mower offer a problem to proper lawn maintenance. If simply left on a lawn, such materials will often dry and form an unsightly mat over the top of a lawn which can harm the grass below by not allowing sunlight to penetrate. Alternatively, such materials will often fall between the blades of grass. If such clippings are relatively large, they will not readily decay but instead will form a mat along the ground surface, virtually choking and destroying the lawn.

Typically, such clippings are collected by use of a lawn mower attachment. The use of such an attachment necessitates that the mower be stopped and the clippings be emptied either during or at the end of the mowing process. Alternatively, the clippings may be removed by raking. Similar to emptying clippings from a lawn mower attachment, this involves extra work. Furthermore, whether the clippings are collected via an attachment or by raking, the gardener is left with the additional problem of disposing of such clippings.

Due to environmental concerns, it is becoming less desirable to dispose of such clippings in the traditional manner, i.e., by bagging them in plastic containers and allowing them to be carried off to a disposal facility such as a land fill or incinerator. While alternatively such materials may be composted, that requires a fairly large amount of space and tends to be malodorous. Because of these drawbacks, composting is especially undesirable in a typical urban environment.

If cut in fine pieces, clippings may be allowed to remain in a lawn with beneficial results. Such finely cut clippings will not form a mat over the top of the lawn, but instead will fall between the blades of grass. Because of the small size of such clippings, they will readily decompose providing nutrients to the lawn instead of forming a choking mat at the base of the blades of grass. Such finely cut clippings are generally referred to as "mulch" and the term "mulching" will be used to refer to a process or method by which such clippings are formed.

Mulching blades which may be used in lieu of traditional lawn mower cutting blades are already known in the art. U.S. Pat. Nos. 4,205,512; 4,292,791; 4,318,268; 4,617,788; 5,094,065; 5,197,268; and 5,209,052 all disclose such mulching blades.

Mulching blades which can be used in conjunction with the normal cutting blade of a rotary mower have also been proposed. U.S. Pat. No. 4,083,166, issued on Apr. 11, 1978 to Haas, discloses a mulching disk attachment which has a mounting hole such that the mulching attachment may be secured to the drive shaft of a rotary mower alongside, i.e., in a contacting relationship with, the cutting blade. The problem with this arrangement is that the efficiency of the cutting blade is reduced due to the operational loss of that portion of the cutting blade in a contacting relationship with the mulching attachment. The claimed mulching disk attachment in Haas also requires impeller blades extending upwardly from the disk for inducing a flow of air upwardly. While the lawn mower cutting blade alone usually induces such an air flow, because the mulching attachment disclosed in Haas is in a contacting relationship with the cutting blade, and interferes with the normal flow of air resulting therefrom, such impeller blades become necessary. The mulching attachment disclosed in Haas also has another drawback in that it requires the use of a separate flanged blade support member to secure and prevent rotation of the mulcher attachment relative to the drive shaft and cutting blade during use.

U.S. Pat. No. 4,967,546, issued on Nov. 6, 1992 to Forbush, discloses a mulching attachment comprising a disk-like base having a cylindrical blade assembly disposed around and attached to the periphery of the disk-like base. Fan vanes are also connected to the disk-like base and are designed to create a radial flow of air across the disk. A problem with the Forbush mulching attachment is that its construction is fairly complex due to the fan vanes and the blade assembly which must be attached to the disk-like base, making it more expensive and subject to component failure. Furthermore, in order to retrofit an existing lawn mower with the Forbush mulching attachment, a mounting collar is disclosed which utilizes a set screw to lock the mounting collar against the drive shaft of the mower. A problem with this arrangement is its lack of universality; a different mounting collar must be provided in order to mount the mulching attachment to different mower drive shafts. Another problem with the Forbush arrangement is that the cylindrical blade assembly requires space between the cutting blade and the lawn mower housing. If such space is not available, the Forbush mulching attachment cannot be used to retrofit that lawn mower.

None of the prior art mulching blade arrangements disclose a mulching blade which is not only easy to manufacture, but which may be easily secured to the drive shaft of a number of existing commercial rotary lawn mowers and which does not interfere with the normal function of the existing cutting blades of such lawn mowers.

SUMMARY OF THE INVENTION

An object of the present invention is to provide a relatively simple but effective mulching blade which can be securely mounted to the drive shaft on a wide variety of rotary lawn mowers.

In carrying out the above objects, and other objects and features of the present invention, a mulching blade is provided which is attachable to the drive shaft of a rotary lawn mower adjacent the existing cutting blade. The mulching blade comprises a generally planar disk shaped mulching member having an outside perimeter defining mulching teeth and a center attachment opening. The mulching blade also has a generally planar attachment bridge spanning the center attachment opening. The generally planar attachment bridge is generally parallel to, but spaced away from, the disk shaped mulching member. The generally planar attachment bridge is supported by bridge ends attached to the disk shaped mulching member. The attachment bridge has a drive shaft opening such that the cutting blade of the lawn mower may be slid between the attachment bridge and the disk shaped mulching member such that both may be mounted together onto the drive shaft of the rotary lawn mower.

The advantages accruing to this invention are several. For example, the mulching blade is easily attachable to the drive shaft of a rotary lawn mower and does not require extra hardware, such as a mounting collar or similar item. Furthermore, due to the simple mounting arrangement of this invention, it may be attached to a wide variety of existing commercial rotary lawn mowers without the necessity of any special attachment parts. A further advantage is that the bridge ends of the attachment bridge maintain the disk shaped mulching portion at a spaced apart distance from the cutting blade, which allows the cutting blade to function normally in creating an updraft flow of air into the mulching blade. Furthermore, the construction of the present invention is fairly simple and may be easily and economically manufactured.

The above objects and other objects, features, and advantages of the present invention will be readily appreciated by one of ordinary skill in the art from the following detailed description of the best mode for carrying out the invention when taken in connection with the accompanying drawings.

BEST MODE FOR CARRYING OUT THE INVENTION

Figure 1:
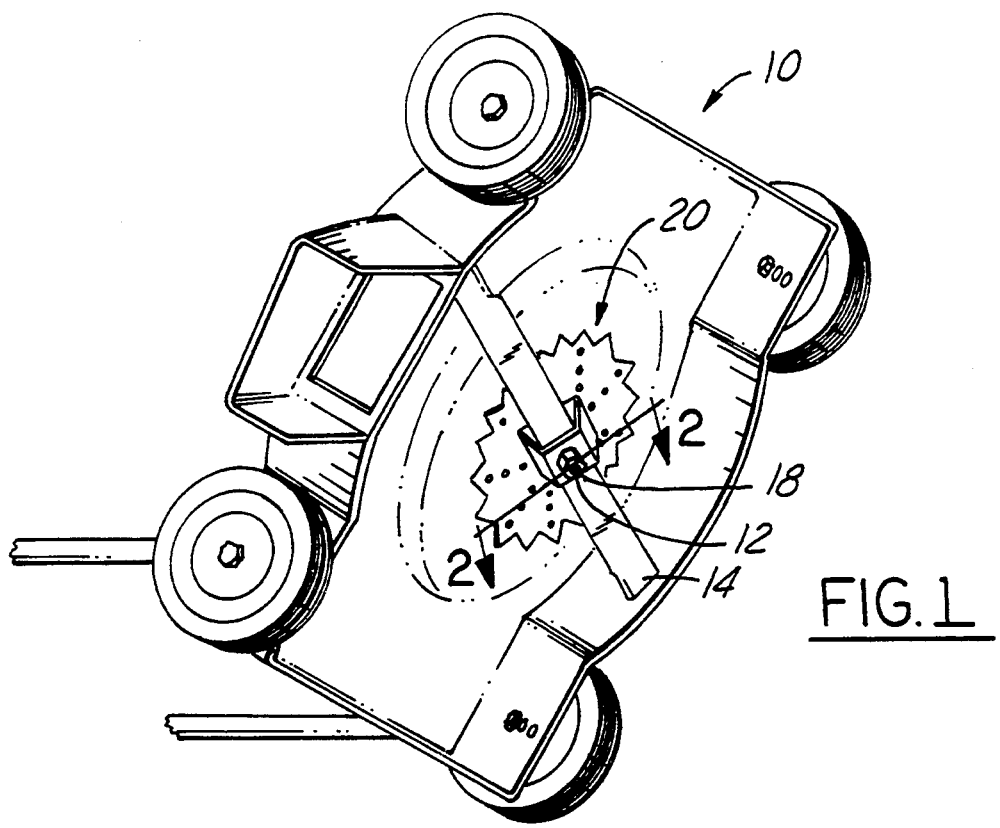
FIG. 1 is a perspective view of the underside of a rotary lawn mower showing the bottom of one embodiment of the improved mulching blade of the present invention installed on the drive shaft of the rotary mower.
Figure 2:
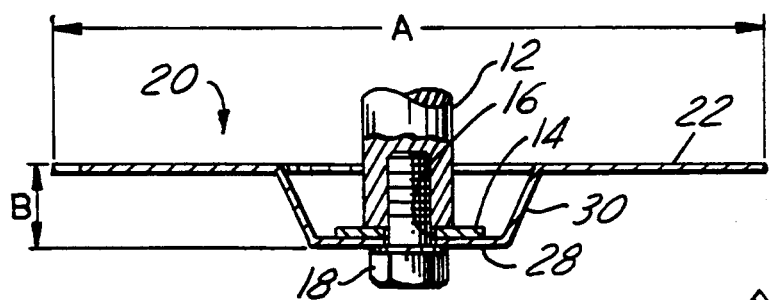
FIG. 2 is a sectional view taken along line 2—2 of FIG. 1.
Figure 3:
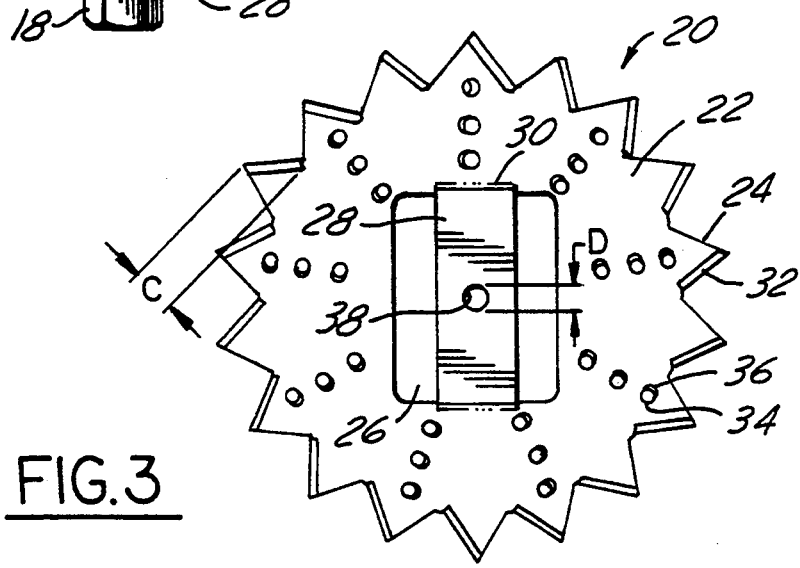
FIG. 3 is a bottom plan view of the one embodiment of the improved mulching blade of the present invention shown in FIG. 1.

One embodiment of the improved mulching blade of the present invention is illustrated in FIGS. 1, 2 and 3. FIG. 1 shows a traditional rotary lawn mower 10 having a drive shaft 12. A traditional cutting blade 14 is mounted onto the drive shaft 12 via a mounting opening 16 and held in place by a bolt 18.

The improved mulching blade 20 of the present invention comprises a generally planar disk shaped mulching portion 22 having an outside perimeter defining mulching teeth 24 and a center attachment opening 26. The attachment opening 26 is spanned by a generally planar attachment bridge 28, the ends of which are attached to the disk shaped mulching portion 22 via bridge ends 30 such that the plane of the attachment bridge 28 is spaced apart from that of the disk shaped mulching portion 22. The mulching blade may be made from sheet steel, such as 14 GA sheet steel, or from sheet aluminum or any other suitable material. The mulching blade 20 may be manufactured by stamping. Alternatively, an assembly comprising the planar attachment bridge 28 and the bridge ends 30 may be attached to the disk shaped mulching portion 22 by welding or otherwise.

As best seen in FIGS. 1 and 3, the mulching teeth 24 may be triangular in shape, or have any other shape suitable for mulching, and are distributed along the circular periphery of the disk shaped mulching portion 22 of the mulching blade 20. The mulching teeth 24 may have a sharpened edge 32 on the side of the mulching teeth 24 which would come into contact with waste material during operation of the rotary lawn mower 10. Also, the plane of each mulching tooth 24 may be offset slightly, alternatively or otherwise, from the plane of the disk shaped mulching portion 22. Such offsets may be manufactured such that the planes of the mulching teeth 24 are parallel to the disk shaped mulching portion 22 or such that the mulching teeth 24 are bent in a slightly askew relationship with the disk shaped mulching portion 22. These offsets can be used to improve the cutting action by increasing the number of sharpened edges 32 traveling along any one plane. Furthermore, the mulching teeth 24 may be manufactured so as to be twisted about the radii of the disk shaped mulching portion 22, such that the mulching teeth 24 create a flow of air, in addition to the flow created by the cutting blade 14, to suck waste material into the mulching blade 20.

It has also been determined that the mulching action of this invention can be improved by providing a sharpened edge 33 to the perimeter of the attachment opening 26, on the side and corner of the attachment opening 26 which would come into contact with waste material during operation of the rotary lawn mower 10.

The mulching blade may also include cutting openings 34 in the disk shaped mulching portion 22 of the mulching blade 20. Such cutting openings 34 may have sharpened opening edges 36 on the edge of the cutting opening 34 coming into contact with waste material as the rotary lawn mower 10 is operated.

The attachment bridge 28 has a drive shaft opening 38 having a diameter which would allow the mulching blade 20 to be attached to the drive shaft 12 of the rotary lawn mower 10 as will be described.

In use, the bolt 18 and the cutting blade 14 of a typical rotary lawn mower 10 is removed from the drive shaft 12. The cutting blade 14 is then slipped between the attachment bridge 28 and the disk shaped mulching portion 22 such that the mounting opening 16 of the cutting blade 14 lines up with the drive shaft opening 38 of the attachment bridge 28. The total assembly is then mounted onto the same drive shaft 12 of the rotary lawn mower 10 from which the cutting blade 14 was removed—through the mounting opening 16 and drive shaft opening 38. The bolt 18 is then threaded back onto the drive shaft 12 in order to prevent the cutting blade 14 and mulching blade 20 assembly from becoming disengaged during use.

As a result of this assembly, the disk shaped mulching portion 22 of the mulching blade 20 is above the cutting blade 14 of the rotary lawn mower 10. It is preferred that the bridge ends 30 have a dimension which would place the disk shaped mulching portion 22 at some distance above and in a non-contacting relationship with the cutting blade 14. This allows the cutting blade 14 to perform its normal dual functions of creating an updraft of air and cutting waste material.

Referring to FIGS. 2 and 3, the following preferred dimensional parameters have been developed to allow the mulching blade 20 to mulch efficiently and to enable the mulching blade 20 to be used on a large number of typical rotary lawn mowers 10.

| Parameter Symbol | Preferred Dimensional Parameter |
| --- | --- |
| A | 8.375 in. |
| B | 1.0 in. |
| C | 0.5625 in. |
| D | 0.40625 in. |

Figure 4:
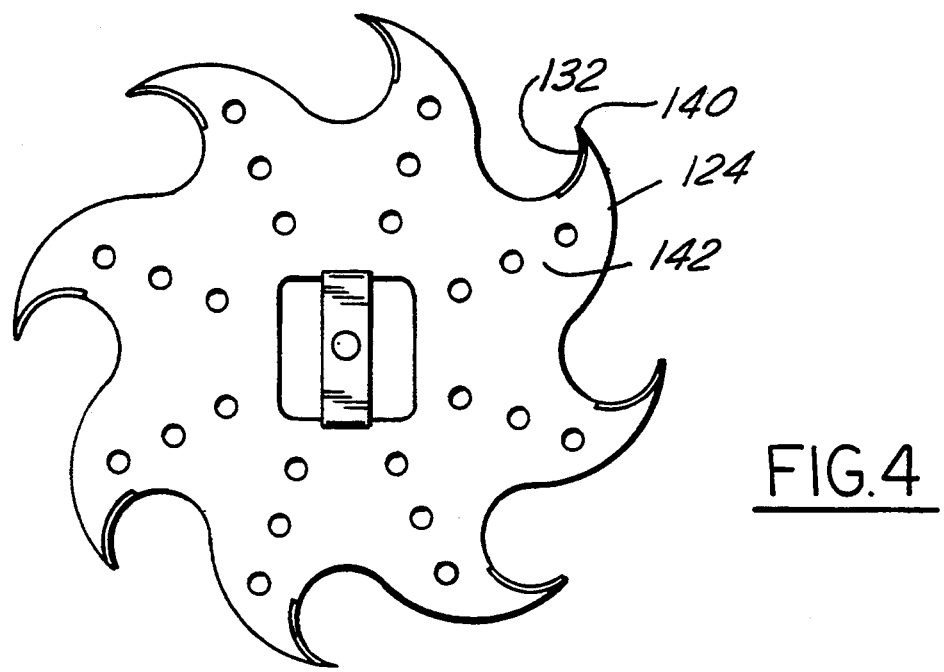
FIG. 4 is a bottom plan view of an alternative embodiment of the improved mulching blade of the present invention.

An alternative embodiment of the invention, as shown in FIG. 4, is identical to the embodiment as illustrated in FIGS. 1, 2 and 3 except for the configuration of the mulching teeth 124. Also, this mulching blade 120 is designed to be used on a lawn mower having a cutting blade which rotates in the opposite direction as the cutting blade indicated in FIGS. 1–3. In this embodiment, the mulching teeth 124 have a sickle shape bent in the forward rotational direction to position the outermost tip 140 of each mulching tooth 24 rotationally forward of each mulching tooth base 142. A sharpened edge 132 may be provided in the forward rotational direction of each mulching tooth 124 to facilitate mulching.

Figure 5:
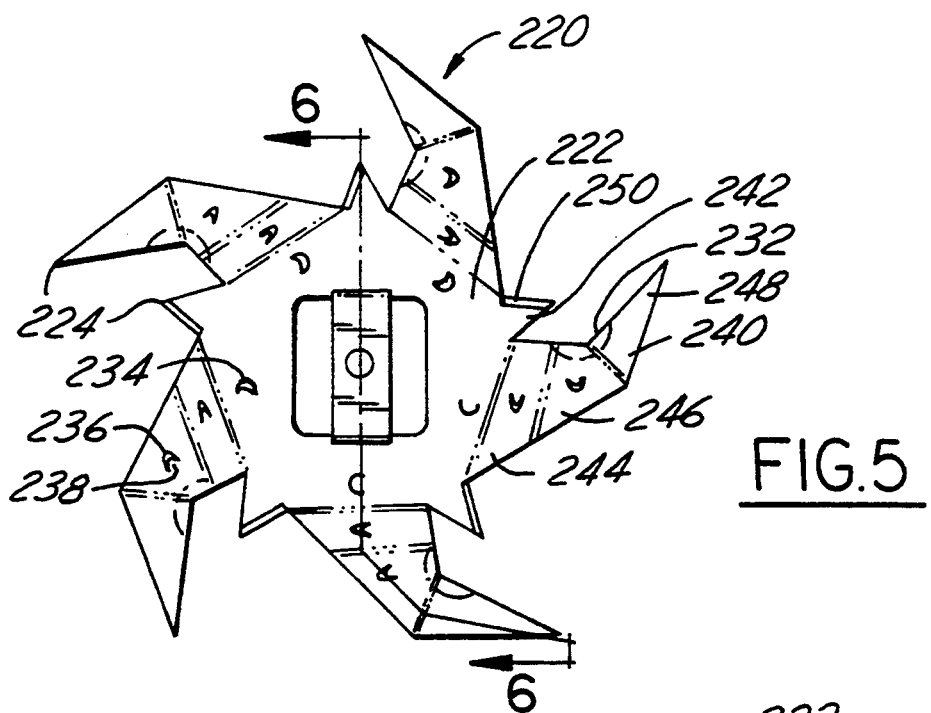
FIG. 5 is a bottom plan view of a second alternative embodiment of the improved mulching blade of the present invention.
Figure 6:
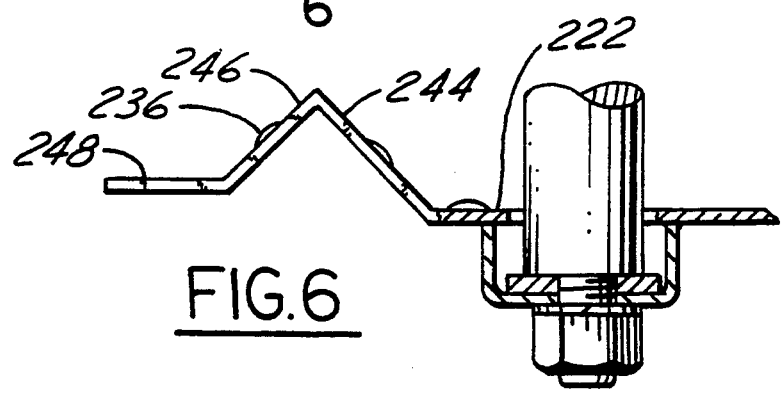
FIG. 6 is a sectional view taken along line 6—6 of FIG. 5.

A second alternative embodiment of the invention, as shown in FIGS. 5 and 6, is likewise identical to the embodiment as illustrated in FIGS. 1–3 except for the configuration of the mulching teeth 224 and the cutting openings 234. Also, this mulching blade 220 is designed to be used on a lawn mower having a cutting blade which rotates in the opposite direction as the cutting blade indicated in FIGS. 1–3. In this embodiment, the mulching teeth 224 comprise two different types, the main mulching teeth 240 and the secondary mulching teeth 242.

The main mulching teeth 240 also have a sickle shape and comprise a first mulching section 244, a second mulching section 246 and a tip mulching section 248. As best seen in FIG. 6, the angle of inclination of the first mulching section 244 relative to the disk shaped mulching portion 222 is upwardly at approximately 45°. The angle of inclination of the second mulching section 246 relative to the disk shaped mulching portion 222 is downwardly at approximately 45°. The tip mulching section 248 is approximately parallel to, and positioned slightly above, the disk shaped mulching portion 222. Sharpened edges 232 may be provided along a portion or the entire length of the main mulching blades 240 in the forward rotational direction of each main mulching blade 240.

The secondary mulching blades 242 are triangular in shape, as best seen in FIG. 5. These secondary mulching blades 242 may be twisted about the radii of the mulching blade 220 at an angle of inclination of approximately 30° relative to the plane of the disk shaped mulching portion 222. The secondary mulching blades 242 may also have secondary sharpened edges 250 in the forward rotational direction of each secondary mulching blade 242.

The secondary mulching blades 242 not only serve to mulch waste material thrown into the mulching blade 220 by the flow of air created by the cutting blade 214 but, if twisted about the radii of the mulching blade 220 as described above, also serve to create an additional flow of air throwing the waste material into the path of the main mulching blades 240.

Cutting openings 234 may also be provided which in this embodiment comprise moon-shaped openings. These cutting openings 234 may have sharpened opening edges 236 opposite the cusp side 238 of the scalloped moon-shaped openings 234 and in the forward rotational direction of the mulching blade 220. As best seen in FIG. 6, the sharpened opening edges 236 may be offset or scalloped outside the plane of the mulching blade 220 in a direction away from the attachment bridge.

It is understood, of course, that while the forms of the invention shown and described constitute preferred embodiments, they are not intended to illustrate all possible forms of the invention. It will also be understood that the words used are words of description rather than of limitation, and that various changes may be made without departing from the spirit and scope of the invention disclosed.

What is claimed is:

1. A mulching blade attachable to a drive shaft of a rotary lawn mower adjacent a cutting blade having a mounting opening by which the cutting blade is mounted onto the drive shaft, the mulching blade comprising:

a generally planar disk shaped mulching portion having an outside perimeter defining mulching teeth and a center attachment opening; and a generally planar attachment bridge spanning the center attachment opening on a plane spaced from that of the disk shaped mulching portion and having bridge ends attached to the disk shaped mulching portion, and forming a passageway there between the attachment bridge having a drive shaft opening such that the cutting blade of the lawn mower may be slid into this passageway between the attachment bridge and the disk shaped mulching portion until the mounting opening of the cutting blade and the drive shaft opening of the attachment bridge are aligned such that both the disk shaped mulching portion and the cutting blade may be mounted together onto the drive shaft of the lawn mower.

2. The mulching blade according to claim 1 wherein the bridge ends are dimensioned such that the generally planar disk shaped mulching portion is spaced from the cutting blade when the disk shaped mulching portion and the cutting blade are mounted together onto the drive shaft of the lawn mower.

3. The mulching blade according to claim 1 wherein the mulching teeth have a triangular configuration.

4. The mulcher blade according to claim 1 wherein the mulching teeth are alternately offset from the plane of the planar disk shaped mulching member.

5. The mulching blade according to claim 1 wherein a number of the mulching teeth have a sickle configuration.

6. The mulching blade according to claim 5 wherein each of the mulching teeth having a sickle configuration has a first mulching section set at an angle to the planar disk shaped mulching portion away from the attachment bridge, a second mulching section set at an angle to and adjoining the first sickle portion such that the direction is towards the attachment bridge, and a top mulching section adjoining the second mulching section and set approximately parallel to the planar disk shaped mulching portion.

7. The mulching blade according to claim 1 wherein the planar disk shaped mulching portion has cutting openings.

8. The mulching blade according to claim 1 further comprising cutting openings in the mulching blade which comprise moon-shaped openings having a cusp side and a sharpened edge which is offset from the mulching blade in a direction opposite the attachment bridge.

* * * * *